United States Patent [19]

Ehrlich

[11] Patent Number: 6,145,420
[45] Date of Patent: *Nov. 14, 2000

[54] TURRET LATHE TOOL HOLDER

[76] Inventor: John D. Ehrlich, 7166 N. Washington, Denver, Colo. 80229

[*] Notice: This patent issued on a continued prosecution application filed under 37 CFR 1.53(d), and is subject to the twenty year patent term provisions of 35 U.S.C. 154(a)(2).

[21] Appl. No.: 09/239,916

[22] Filed: Jan. 28, 1999

[51] Int. Cl.[7] .................................................... B23B 29/24
[52] U.S. Cl. ................................ 82/159; 82/160; 82/161; 82/168
[58] Field of Search .............................. 82/165, 159, 158, 82/160, 120, 121, 168, 161; 408/35; 29/35.5, 39, 40, 41

[56] References Cited

U.S. PATENT DOCUMENTS

| | | | |
|---|---|---|---|
| 3,750,498 | 8/1973 | Willen | 82/36 |
| 4,006,518 | 2/1977 | Rudolph et al. | 82/27 |
| 4,598,617 | 7/1986 | Kubo et al. | 82/36 R |
| 4,682,521 | 7/1987 | Duenas | 82/36 |

*Primary Examiner*—Henry W. H. Tsai
*Attorney, Agent, or Firm*—Ramon L. Pizarro; Edwin H. Crabtree

[57] ABSTRACT

A tool holder which uses a collet for holding a stationary tool on a turret of a turret lathe. The turret being of the type having a plurality of flat surfaces adapted for receiving a tool holder. The tool holder includes a body with a flat surface adapted for mounting against at least one of the flat surfaces of the turret, and a fixed aperture of a fixed size having an axis, a first end centered on the axis and a second end centered on the axis and a constriction starting near the first end and gradually reducing the size of the aperture in the direction of the second end. At least two locations for fixedly mounting the body against the turret are positioned next to the aperture, and allow for mounting of the body against the turret in a fixed position. Structure which allows the introduction of an axial load on the collet, the axial load being in the direction of the axis of the aperture, and which cooperates with the body, so that the axial load radially collapses the collet when the collet is mounted in the aperture, and so that the tool to be attached to the turret lathe is gripped by the collet.

14 Claims, 3 Drawing Sheets

TURRET LATHE TOOL HOLDER

BACKGROUND OF THE INVENTION (a) Field of the Invention

This invention generally relates to a tool holder for a turret lathe, and more particularly, but not by way of limitation, to a turret lathe tool holder which uses a collet for adjustment and support of the tool.

(b) Discussion of Known Art

Turret lathes are particularly well known manufacturing machines which have been favored for production runs due to the high production rates that are achievable with the use of a turret lathe. These high production rates due in large part to the fact that the operations to be carried out on the workpiece can be changed by a simple rotation of the turret that supports the tools being used. The turret typically includes several faces which include means for indexing tools to be mounted on the face.

A well recognized problem with turret lathes is that the setup time to mount the required tools and to position the workpiece can be relatively long. The tools to be mounted on the individual faces of the turret are typically fastened or bolted against the facet on the turret through a tool support which includes a split bore which accepts a bushing, which in turn accepts the tool to be supported on the turret.

The bushing used to accept the tool must be machined to match the shank of the specific tool that is to be used. This means that the bushing must be made to match the split bore in the tool support as well as the diameter of the tool. Once the bushing has been prepared, the shank of the tool is inserted into the bushing, and then the bushing, together with the tool, is inserted into the bore of the tool support. The split in the bore of the tool support typically includes fasteners which extend through the split and which are used to tighten the split bore around the bushing and tool shank assembly. This known method for supporting the tool presents some significant disadvantages to the user of the turret lathe.

One significant disadvantage, aside from the disadvantage of having to make a customized bushing, is that the fastening of the bushing into the split bore of the support will necessarily hold the bushing at a location that is slightly off center from the central axis of the bore. An example of a tool support which includes a split bore is illustrated in U.S. Pat. No. 5,063,799 to Brewer. FIG. 1 of the Brewer patent, incorporated herein by reference, illustrates the structure of known tool holders. The split bore which is used to support the bushing will necessarily bias one side of the bore towards the opposing side, squeezing the bushing between the sides of the split bore. Accordingly, to be able to provide some sort of clamping force to the bushing, the gap created by the split on the bore will necessarily produce an oblong aperture once closed. Moreover, the closing of the gap to squeeze the bushing will also result in positioning of the centerline of the tool shank and the bushing at a location that is slightly offset from the of the split bore in its undeformed state.

Other turret lathe tool gripping devices include the device described in U.S. Pat. No. 2,833,546, which includes a revolving turret that mounts into tailstock of a conventional lathe to enable the user to quickly change the tool used against the workpiece.

Another tool support device is taught in U.S. Pat. No. 5,080,536 to Andrews, which agin follows conventional tool support conventions by providing a bushing with a split bore that is squeezed transversely to accommodate the diameter of the shank of the tool to be supported. The transverse force approach is also illustrated in U.S. Pat. No. 2,369,209 to Bullard, 3d., et al.

The radial clamping action of collets is well known. The application of collets as supports for tools, however, has been limited to the use of the collet in chucks and the like, where a rotating tool, such as a drill bit is being rotated and driven into the workpiece. For example, in U.S. Pat. No. 5,522,605 Lewis et al., a collet based chuck for holding a drill bit is described. However, the Lewis patent does not provide guidance as to how a collet could be used to support a cutting tool, particularly a stationary cutting tool that is supported against the turret of a turret lathe. Importantly, the Lewis patent does not provide any suggestion as to whether it would be desirable to use a collet in anything other than a chuck. Similarly, U.S. Pat. No. 4,817,972 to Kubo, and U.S. Pat. No. 2,337,471 to Hines discuss the desirability of collets in rotating tool supports such as chucks.

Thus, a review of known tool supports reveals that the use of an transverse, or non-radial, force to grip a stationary tool is widely accepted. Examples of this approach at gripping tools are found in U.S. Pat. No. 5,214,989 to Giannetti, U.S. Pat. No. 4,890,523 to Satran.

Therefore, a review of known devices reveals that there remains a need for a simple device that can reliably support a tool against a turret on a turret lathe, without introducing the distortions of a transversely gripping device.

Still further, there remains a need for a tool gripping device for a turret lathe, the tool gripping device obviating the need for an intermediary bushing that is to be held by the tool support.

Even further yet, there remains a need for a tool support for a turret lathe, wherein the tool support does not protrude excessively from the turret, as for example if a conventional chuck were to be used to support a tool from the turret.

SUMMARY

It has been discovered that the problems left unanswered by known art can be solved by providing tool support for holding tools against the turret, the turret having at least one flat surface for mounting a tool on a turret lathe, the tool support including:

a) a body with a flat surface adapted for mounting against at least one of the flat surfaces of the turret and having means for fixedly attaching the flat surface against the turret and holding the body in a stationary position relative to the turret, the body including an aperture having an axis and a constriction starting near the first end and gradually, and a collet within the aperture; and b) a loading mechanism for imposing an axial load on a collet, so that the tool to be attached to the turret lathe is gripped by the collet as the axial load is imparted on the collet.

According to another aspect of the invention, a method for supporting a stationary cutting tool in a fixed position relative to a turret on a turret lathe is disclosed. The method is particularly useful in applications where the stationary cutting tool includes a body with a generally cylindrical section. The method includes the steps of providing a collet, and mounting the collet on a stationary base having a body having a flat surface adapted for mounting against at least one of the flat surfaces of the turret and having means for fixedly attaching the flat surface against the turret. Then fixedly attaching the body against the turret and inserting the collet into the aperture in the body. Then inserting the cutting tool into the collet; and imposing an axial load on the collet, so that the axial load radially collapses the collet against the tool when the collet is mounted in the aperture, and so that the tool to be attached to the turret.

It will be appreciated that the disclosed tool support and method offers significant, important advantages which could not be achieved with known devices. An important new advantage is that the disclosed tool support provides support for the collet at a locating immediately over the turret. This positioning minimizes or reduces the cantilevered distance required for supporting the tool if using collet tools as in a chuck, for example.

Additionally, the disclosed invention eliminates the need to provide bushings or the like to support the tool against the turret. Still further, it will be appreciated that the disclosed invention eliminates tolerance problems associated with the stackup of several components. Also, the disclosed invention greatly reduces setup times for machining with turret lathes, since the use of special bushings for each tool and support is eliminated.

It should also be understood that while the above and other advantages and results of the present invention will become apparent to those skilled in the art from the following detailed description and accompanying drawings, showing the contemplated novel construction, combinations and elements as herein described, and more particularly defined by the appended claims, it should be clearly understood that changes in the precise embodiments of the herein disclosed invention are meant to be included within the scope of the claims, except insofar as they may be precluded by the prior art.

DRAWINGS

The accompanying drawings illustrate preferred embodiments of the present invention according to the best mode presently devised for making and using the instant invention, and in which.

DETAILED DESCRIPTION OF PREFERRED EXEMPLAR EMBODIMENTS

While the invention will be described and disclosed here in connection with certain preferred embodiments, the description is not intended to limit the invention to the specific embodiments shown and described here, but rather the invention is intended to cover all alternative embodiments and modifications that fall within the spirit and scope of the invention as defined by the claims included herein as well as any equivalents of the disclosed and claimed invention.

Figure 1:
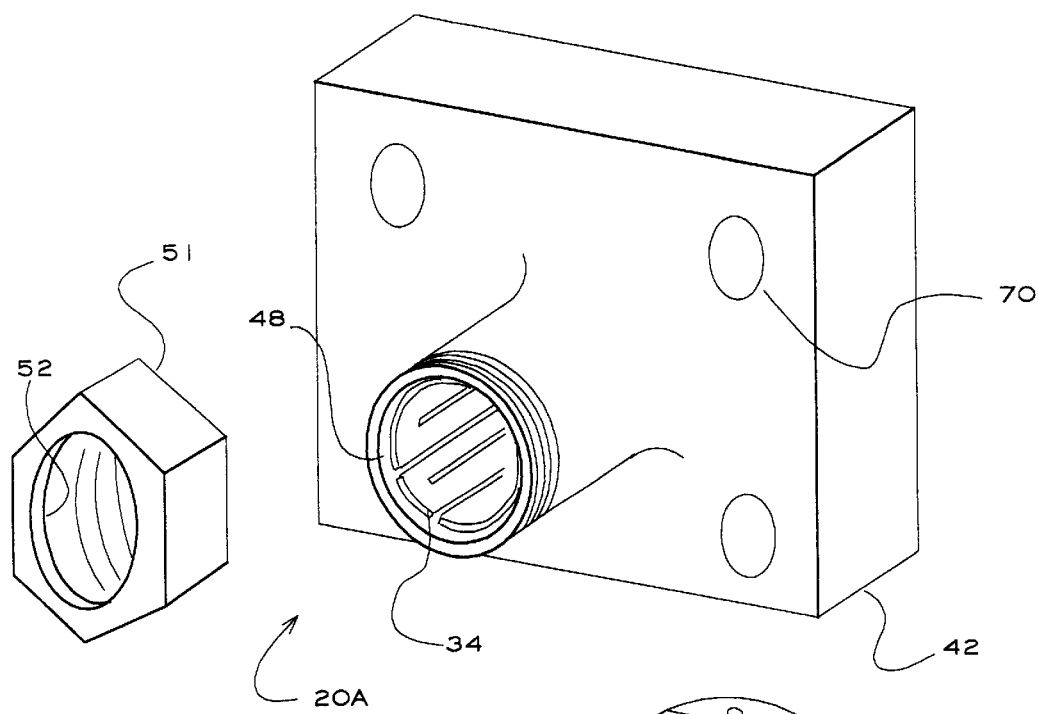
FIG. 1 is a perspective view of an embodiment of the invention, the embodiment including a collet support that is fixed in a normal orientation relative to a body which mounts against a surface of a turret.
Figure 2:
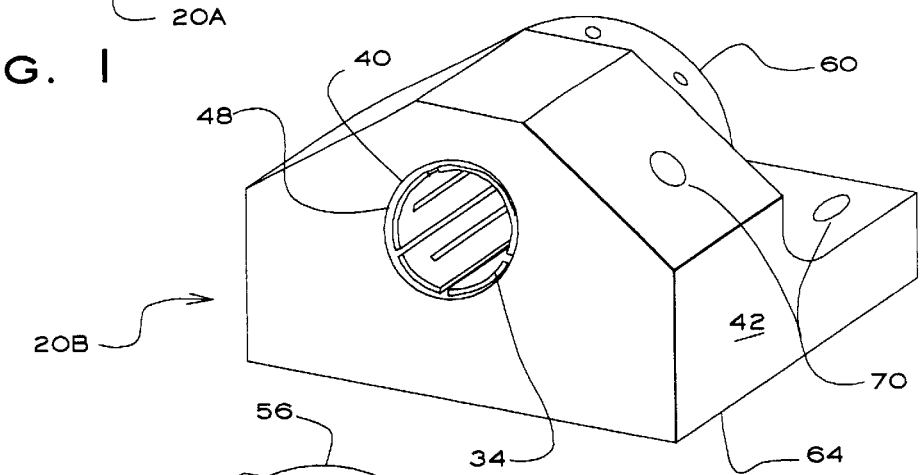
FIG. 2 is a perspective view of another embodiment of the invention, the embodiment including a collet support that is fixed in a substantially parallel orientation relative to a body which mounts against a surface of a turret.
Figure 3:
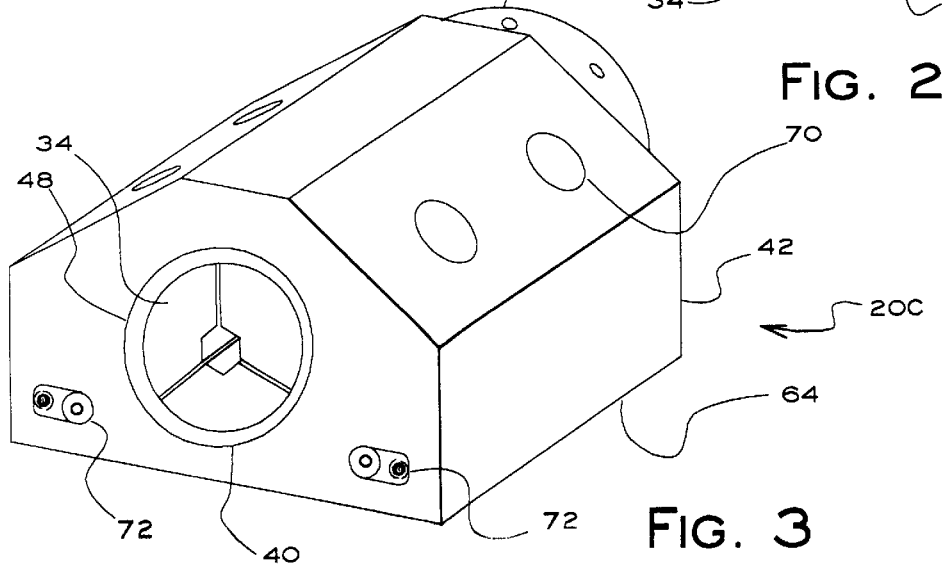
FIG. 3 is a perspective view of yet another embodiment of the invention, the embodiment including a collet support that is fixed in a substantially parallel orientation relative to a body which mounts against a surface of a turret.
Figure 4:
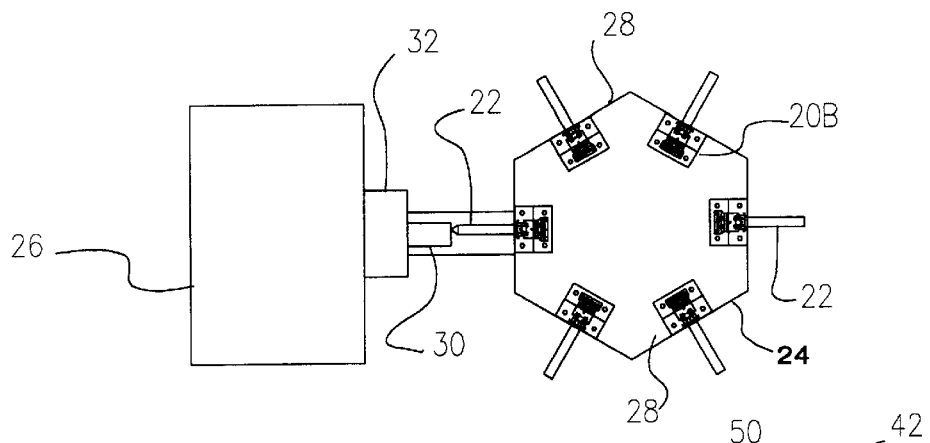
FIG. 4 is a plan view of a common turret arrangement of a turret lathe, the turret supporting tools on tool holders made in accordance with the embodiment illustrated in FIG. 2.

Turning now to FIGS. 1 through 4 which show perspective views of embodiments of a tool holder, shown in terms of several highly preferred embodiments, referenced as tool holders 20A, 20B, and 20C, shown in FIGS. 1, 2, and 3, respectively. Each of the tool holders serves for holding a stationary tool 22 on a turret 24 of a turret lathe 26. As shown on FIG. 4, it is contemplated that the disclosed tool holder, or tool holder system, will be particularly useful for mounting tools on turrets 24 where the turret 24 includes a plurality of flat surfaces 28 which have been adapted for receiving a tool holder.

As discussed above, it is common practice to use tool holders for supporting tools in a fixed relationship relative to the turret 24. These fixed, or stationary tools include tools which are not turned, but are held stationary while the workpiece 30 is turned by a spindle 32 on the turret lathe 26.

As shown in the enclosed figures, the disclosed tool holder will use a collet 34 to hold the shank 36 of the stationary tool 22. Thus as shown on FIGS. 1, 5 and 6, the collet 34 will include a generally conical portion 38 which will cooperate with an aperture 40 in the body 42 of the tool holder 20A. It is preferred that the aperture 40 will be of a fixed size and extend along a fixed axis 41. To collapse the collet 34 in order to grip a tool in the tool holder it is contemplated that the tool holder will include a means 44 for imposing an axial load on the collet 34. The axial load will serve to collapse the collet 34 in a radial manner due to the reaction of the conical surface 38 of the collet 34 against a constriction 46 in the aperture 40. Thus, the aperture 40 of the tool holder 20A includes a first end 48 which is centered on the axis 41, and a second end 50, which is also centered on the axis 41. The constriction 46 starts at a location near the first end 48 and results in a gradually reducing the size of the aperture 40 as one progresses in the direction of the second end 50. It is important to note that the term "fixed aperture" or of "fixed diameter" as used herein refers to a fixed diameter at a given cross-section along the aperture 40. In other words the diameter of the aperture is not variable as in a chuck type structure, for example.

Therefore, in the tool holder 20A and 20C, for example, to grip a tool of a fixed shank 36 diameter, the user would insert the collet 34 in the aperture 40 and exert an axial force against the collet 34 so that conical surface 38 of the collet 34 will bear against the constriction 46 in the body 42. In the embodiment of 20A, this axial force is imposed by a nut 51 which includes flanges 52 which engage the collet 34 and force the conical surface of the collet 34 against the constriction 46. The fixed shape of the constriction 46 forces the radial reduction of the collet 34.

Figure 9:
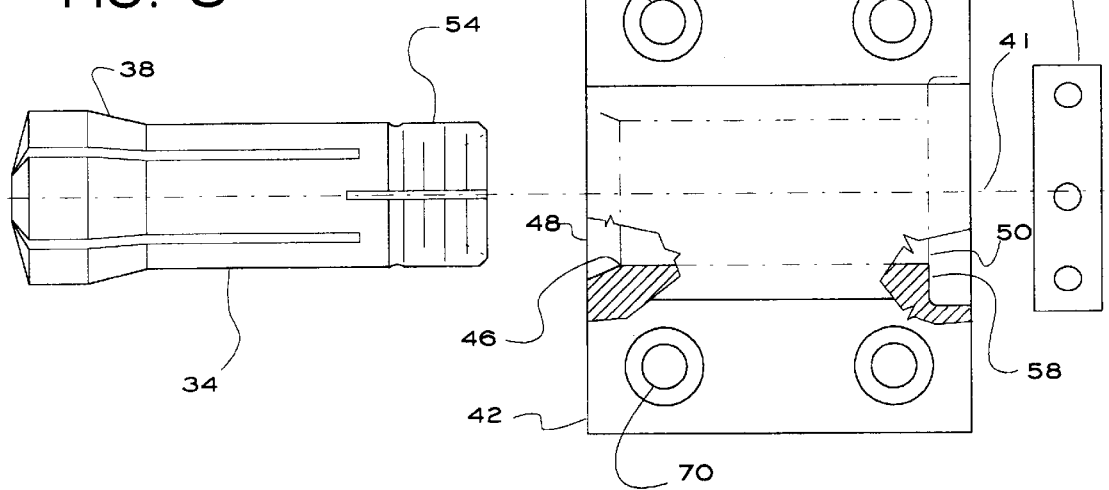
FIG. 9 is an exploded view of the embodiment of the invention illustrated in FIG. 3.

In the embodiment of the invention illustrated in FIG. 9, the collet 34 includes a threaded portion 54. This threaded portion 54 is engaged by a tensioning nut 56, which cooperates with a ledge 58 on the body 42 of the tool holder 20C. The ledge 58 reacts any tension loads imposed on the collet 34 by the tightening of the tensioning nut 56 along the threaded portion 54 of the collet 34.

Figure 5:
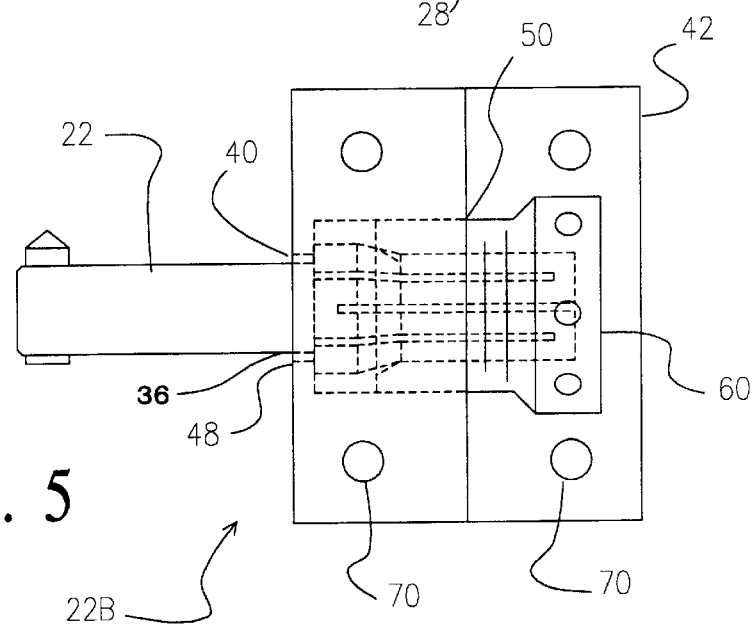
FIG. 5 is a top, plan view of a the embodiment of the invention illustrated in FIG. 2, the embodiment illustrated while supporting a boring bar.
Figure 6:
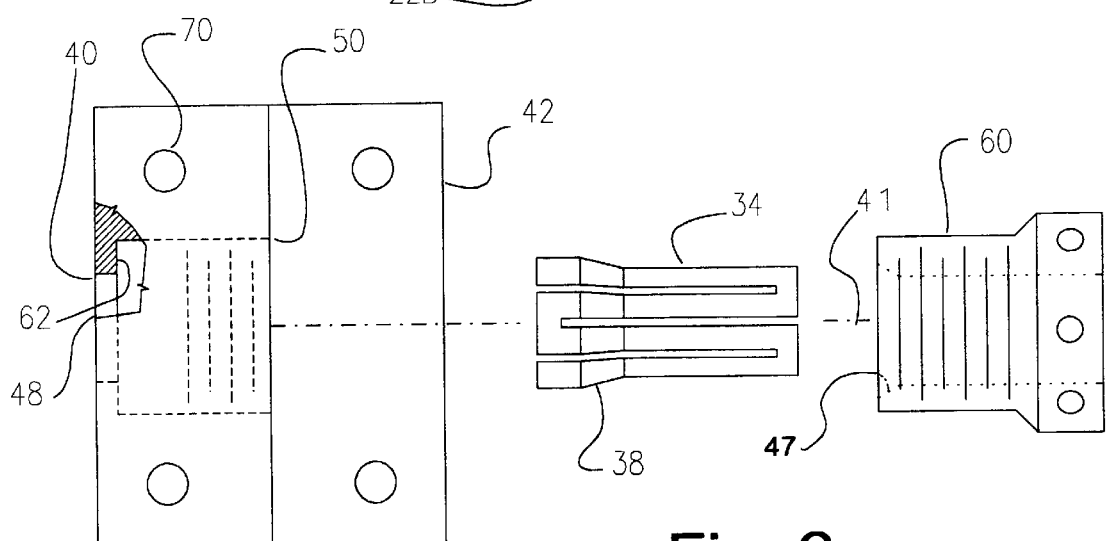
FIG. 6 is an exploded view of the components used with the embodiment illustrated in FIG. 2.

In the embodiment of the invention illustrated in FIGS. 2, 5 and 6, the conical portion 38 of the collet 34 will react with a conical constriction 47 on a sleeve 60 which will hold the collet 34. The body 42 of the holder 20B will include a flanged portion 62 which will react with an axial force imposed on the collet 34 by the tightening of the sleeve 60 into the aperture 40 in the body 42 of the embodiment of the tool holder 20B.

Figure 7:
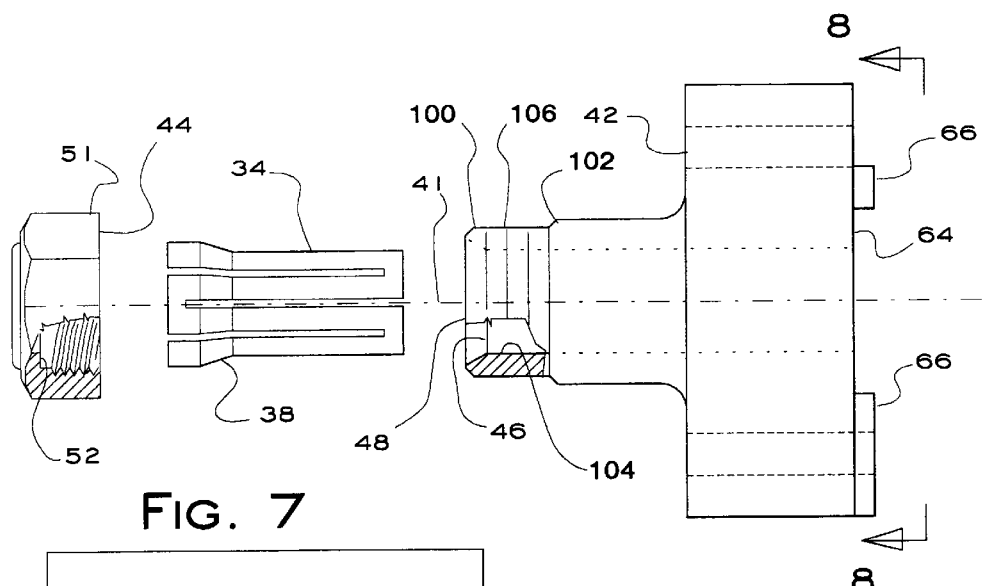
FIG. 7 is an exploded view of the embodiment of the invention illustrated in FIG. 1.
Figure 8:
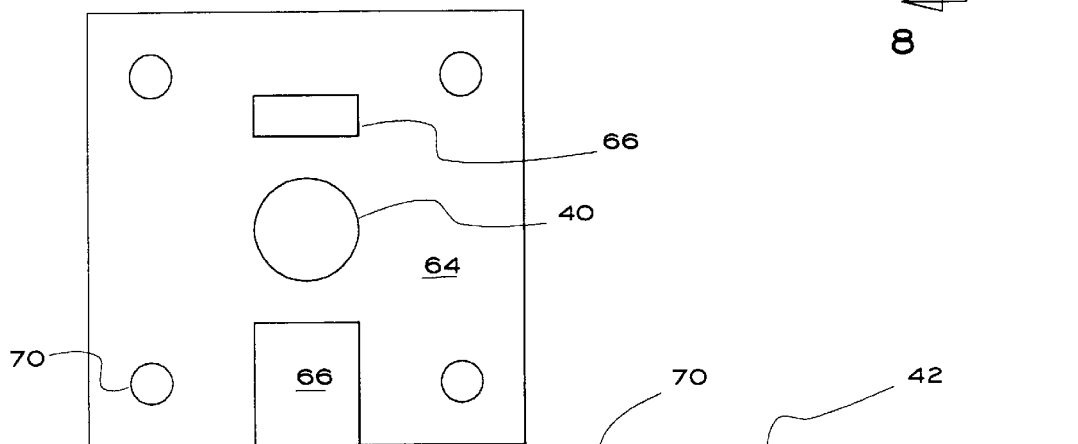
FIG. 8 is an end view taken from FIG. 7, as indicated in FIG. 7, and illustrating the generally flat surface of the body of the tool support. The generally flat surface includes guides which mate with guides on the turret to provide for sliding adjustment over the surface of the turret.

Turning now to the body 42 of the disclosed invention, it will be understood from FIGS. 2, and 7 through 9, that the body 42 of a tool holder manufactured under the principles taught herein will include a generally flat surface 64. The generally flat surface 64 has been adapted for mounting of the body 42 against at least one of the flat surfaces 28 of the turret 24. Turning to FIGS. 7 and 8 it will be understood that in a preferred embodiment of the invention the flat surface 28 include guides 66, which in a preferred embodiment will be block shaped or straight edged projections which have been shaped to cooperate with similarly shaped grooves on the flat surfaces 28 of the turret lathe 26. As can be understood from FIG. 7, the invention will include a nipple portion 100 protruding from the body 42. The nipple portion 100 will include an external portion 102 that includes a threaded portion 106 or similar mechanism that allows engagement of a nut or the like. The illustrated nipple portion 100 will also include a fixed aperture 104 that extends through the nipple portion 100 and the body 42.

To attach or mount the disclosed invention against the flat surface 28 of the turret lathe 26, it is preferred that the body accept means for fixedly attaching the flat surface 64 against the turret 24. In a highly preferred embodiment of the invention these means for attaching the body 42 against the flat surface 28 of the turret lathe 26 includes fastener holes 70 which are positioned on opposite sides of the fixed axis 41 of the aperture 40. The fastener holes 70 cooperate with the guides 66 to hold the body in a desired stationary position on the turret 24. It is important to note that while the guides 66 have been illustrated on the embodiment 20A, it is contemplated that these guides will be incorporated into the embodiments 20B and 20C.

Since the disclosed tool holder is particularly useful for supporting a fixed tool against a turret 24. It is important to note that the fastened attachment of the body against the flat surface 28 of the turret 24 provides significant stability to the tool holder, which in turn results in precise and highly reproducible, consistent machining on the workpiece 30. Accordingly, the arrangement of the embodiments 20B and 20C is of particular advantage, since by positioning the aperture 40 in a substantially parallel manner directly over the flat surface 28 of the body, one provides a highly stable and balanced assembly which can easily react bending moments imposed by the cutting forces transmitted through the cutting tool 22. In other words, by providing a flat surface 64 which extends the entire length of the aperture 40 one provides a large surface over which to react the cutting forces generated by the machining activity.

Also shown on FIG. 3 is that it is contemplated that the body 42 may also incorporate means 72 for circulating a cooling fluid through the body 42. In a preferred embodiment, these means 72 for circulating a cooling fluid include an attachment of a cooling fluid delivery hose, together with the appropriate ducting or fluid routing through the body 42.

Thus it can be appreciated that the above described embodiments are illustrative of just a few of the numerous variations of arrangements of the disclosed elements used to carry out the disclosed invention. Moreover, while the invention has been particularly shown, described and illustrated in detail with reference to preferred embodiments and modifications thereof, it should be understood that the foregoing and other modifications are exemplary only, and that equivalent changes in form and detail may be made without departing from the true spirit and scope of the invention as claimed, except as precluded by the prior art.

What is claimed is:

1. A tool holder for holding a collet having a central axis, the collet serving for holding a stationary tool on a turret of a turret lathe, the turret having a plurality of flat surfaces adapted for receiving a tool holder, the tool holder comprising:

a body having a flat surface adapted for mounting against at least one of the flat surfaces of the turret and a nipple portion protruding from the body, the nipple portion having a threaded portion, and the body further comprising a fixed aperture extending through the nipple portion and the body, the aperture being parallel to the flat surface of the body and being of a fixed size and having a central axis, the aperture further having a first end centered on the axis and a second end centered on the central axis, the aperture being adapted for accepting the collet such that the axis of the collet coincides with the central axis of the aperture;

means for circulating a cooling fluid through said body;

means for mounting said body against the turret, said means for mounting said body against the turret being next to the aperture in the body and being normal to the aperture in the body, with the aperture in the body being between said means for mounting said body against the turret; and means for engaging the threaded portion and enclosing the collet between the threaded portion and the body and imposing an axial load on the collet and radially contracting the collet, the axial load being in the direction of the axis of the aperture, and for reacting the axial load against the body, so that the axial load radially collapses the collet when the collet is mounted in the aperture and the axis of the collet coincides with the axis of the aperture, and so that the tool to be attached to the turret lathe is gripped by the collet, and held in at a fixed distance from the turret along the axis of the collet and the axis of the aperture in the body.

2. A tool holder according to claim 1 wherein the axis of said aperture is substantially parallel to said flat surface of said body.

3. A tool holder according to claim 2 wherein said means for mounting extend in a direction that is substantially normal to the flat surface of the body.

4. A tool holder according to claim 1 wherein the axis of said aperture is directly over and substantially parallel to said flat surface of said body.

5. A tool holder for holding a stationary tool on a turret of a turret lathe, the turret having a plurality of flat surfaces adapted for receiving a tool holder, the tool holder comprising:

a collet having a central axis;

a body having a flat surface adapted for mounting against at least one of the flat surfaces of the turret and having means for attaching the flat surface against the turret and holding the body in a stationary position relative to the turret, the body further comprising a nipple portion protruding from the body, the nipple portion having a threaded portion and an aperture having an axis, the aperture having a first end centered on the axis and a second end centered on the axis, the aperture being adapted for accepting the collet such that the axis of the collet coincides with the axis of the aperture, and a constriction starting near the first end and gradually reducing the size of the aperture in the direction of the second end;

means for circulating a cooling fluid through said body; and means for cooperating with said threaded portion of the nipple portion and imposing a compressive axial load on said collet, the compressive axial load being in the direction of the axis of the aperture, and for reacting the compressive axial load against the nipple portion, so that on imposing the compressive axial load on the collet with the means for imposing an axial load the axial load, radially collapses the collet against the tool when the collet is mounted in the aperture and the axis of the collet coincides with the axis of the aperture, and so that the tool to be attached to the turret lathe is gripped by the collet within the nipple portion.

6. A tool holder according to claim 5 wherein the axis of said aperture is substantially parallel to said flat surface of said body.

7. A tool holder according to claim 6 wherein said means for mounting extend in a direction that is substantially normal to the flat surface of the body.

8. A tool holder according to claim 7 wherein said aperture is directly over the flat surface of the body.

9. A tool holder according to claim 8 wherein said aperture is smaller than the flat surface of said body.

10. A tool holder according to claim 9 wherein said body further comprises means for circulating a cooling fluid through said body.

11. A tool holder according to claim 9 wherein said flat bottom of said body further comprises means for indexing said body to the flat surface of the turret.

12. A method for supporting a stationary cutting tool in a fixed position relative to a turret on a turret lathe, stationary cutting tool having a body having a generally cylindrical section, the method comprising:

providing a collet having a central axis;

providing a tool holder having a body having a flat surface adapted for mounting against at least one of the flat surfaces of the turret and having means for attaching the flat surface against the turret and holding the body in a stationary position relative to the turret, the body further comprising a nipple portion protruding from the body, the nipple portion having a threaded portion and an aperture extending through the nipple portion, the aperture having an axis, the aperture having a first end centered on the axis and a second end centered on the axis, and a constriction starting near the first end and gradually reducing the size of the aperture in the direction of the second end, and means for circulating a cooling fluid through said body near said nipple portion; and means for imposing an axial load on said collet, the axial load being in the direction of the axis of the aperture and for reacting the axial load against the body;

attaching the body against the turret;

inserting the collet into the aperture in the body;

inserting the cutting tool into the collet;

providing a nut adapted for cooperating with the threaded portion of the nipple portion and mounting the nut on the threaded portion to impose an axial load on the collet, so that the axial load radially collapses the collet against the nipple portion when the collet is mounted in the aperture, and so that the tool to be attached to the turret lathe is gripped by the collet; and delivering a cooling fluid through said body.

13. A method according to claim 12 wherein said step of attaching the body against the turret is carried out by fastening the body against the turret.

14. A method according to claim 13 wherein said step of fastening is carried out by attaching at least two fasteners through said body on opposing sides of said aperture.

* * * * *